Patented June 4, 1946

2,401,440

UNITED STATES PATENT OFFICE 2,401,440

CELLULOSE PHOSPHONAMIDES

Charles A. Thomas and Gennady Kosolapoff, Dayton, Ohio, assignors to Monsanto Chemical Company, a corporation of Delaware No Drawing. Application February 18, 1942, Serial No. 431,337

19 Claims. (Cl. 8—120)

This invention relates to new phosphorus and nitrogen containing derivatives of cellulose, more particularly to cellulose phosphonamides, to a process of producing the same, and to a process for the flame-proofing of cellulose materials by the preparation of the phosphonamide derivatives thereof.

According to this invention, new phosphorus and nitrogen containing derivatives of cellulose having the formula:

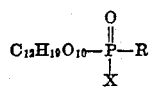

where $C_{12}H_{19}O_{10}$ represents a residue of a $C_{12}$ unit of cellulose and R represents $NH_2$ or $ONH_4$ and X represents $NH_2$, $ONH_4$ or OH, are prepared by treating cellulose with phosphoryl chloride in such a manner that there is first obtained a cellulose phosphoryl chloride and then treating the so-formed cellulose phosphoryl chloride with ammonia.

Thus according to the process of this invention we obtain cellulose phosphodiamide probably by the scheme:

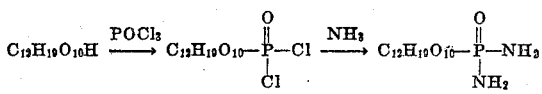

wherein hydrolysis of the primarily formed dichloride is substantially prevented. In the presence of substantial amounts of moisture, however, whereby the primarily formed dichloride is partially hydrolyzed to the monochloride we obtain cellulose phosphonamide, probably by the scheme:

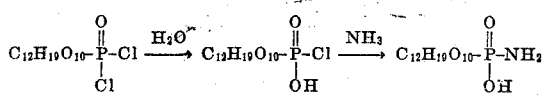

Presence of moisture in the amination of either the monochloride or the dichloride may result in the substitution of an —$ONH_4$, instead of an —$NH_2$ radical for the chlorine atom, the reaction with the dichloride thus probably proceeding according to the scheme:

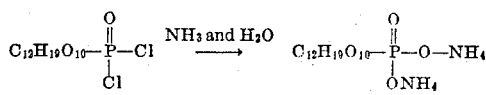

The incorporation of the ammonia into the cellulose phosphoryl chloride may also result in the formation of a stable, polymeric cellulose phosphonamide, probably of the structure:

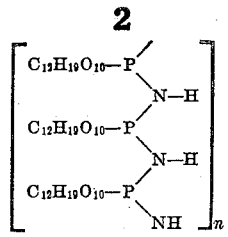

where $n$ is an integer of high order corresponding to the total number of glucose units present in the cellulose molecule, or fractions thereof, depending upon the extent of the phosphorylation.

The new phosphorus and nitrogen containing derivatives of cellulose herein disclosed are characterized by high stability to heat and water. They are neither solubilized or decomposed by boiling water or hot alkaline soap solutions. The compounds are completely flameproof and absolutely glowproof.

According to X-ray analysis, cellulose consists of micelles and crystallites, each micelle being a bundle of parallel chains of cellobiose residues. Theoretically, since there are three hydroxy groups available in each of the dextrose units, the reaction of cellulose with an esterifying agent should result in the production of triesters. As is known to those skilled in the art, however, when a molecule of an esterifying reagent interacts with a hydroxy group of cellulose, it does so at random until all the hydroxy groups have been esterified. For this reason, esterification of cellulose does not result in a homogeneous mono- or di-substitution product; instead, hybrid-like, part-cellulose, part-ester products are formed.

Whereas total esterification of a cellulosic body results in a product which no longer shows the fibrous structure of cellulose, the properties of the partially esterified products vary with the extent of reaction, very slightly esterified cellulose resembling cellulose in structure.

The properties of our phosphamated cellulose, therefore, vary with the extent of the primary phosphorylation. Thus, while we may react loose cotton, for example, with phosphoryl chloride in such a way as to obtain upon subsequent amination an insoluble, flame-resistant, amorphous body, we may also, by regulating the extent of the reaction with phosphoryl chloride, obtain upon subsequent amination a body in which the original cellular structure has been preserved, but which has been rendered flame and glowproof due to conversion of the hydroxy groups in the surface micelles to phosphamido radicals. The partial conversion of cellulose into a partly phosphamated cellulose thus affords an excellent method for the flameproofing of cotton and other cellulose-containing fabrics.

Thus, for the flameproofing of loose cotton or cotton textiles we prefer to operate as follows: We react cotton immersed in pyridine or other liquid anhydrous base with approximately one-half its amount by weight of phosphoryl chloride in order to obtain a cellulose phosphoryl chloride, cool strongly and pass dry ammonia gas through the mass to complete neutralization in order to form a cellulose phosphonamide. In this manner there is obtained a flameproofed cotton or cellulose containing fabric which shows no evidence of having been degenerated or otherwise adversely affected by the reaction. The partially phosphamated cellulose resists ignition and does not support combustion when held in the open after exposure to a flame and it possesses this property after repeated washings with soap and warm water as well as after one year's storage under ordinary atmospheric conditions. That a chemical reaction, and not a mere impregnation of the cotton with phosphoryl chloride and ammonia has occurred may be concluded from the fact that phosphorus and nitrogen analyses of the reacted cotton before and after repeated laundering are substantially identical.

Although it is preferred to use pyridine or other liquid anhydrous base as the reaction media, we may first pre-treat the cellulose with a base, say, a water-alcohol solution of sodium hydroxide, and then react it with phosphoryl chloride in the presence of an inert solvent such as carbon tetrachloride. When a highly alkaline media is used it serves as a neutralizing agent for the hydrogen chloride liberated during the reaction. When an alkalized cellulose is treated, reaction with the phosphoryl chloride results in the liberation of sodium chloride rather than hydrogen chloride; hence, a neutral reaction media may be used in the phosphorylation. It is essential that substantially anhydrous conditions be maintained during the reaction in order to prevent hydrolysis of the cellulose phosphoryl chloride.

The invention thus embraces the reaction of phosphoryl chloride with cellulose in such a manner that the liberated hydrogen chloride is largely immediately neutralized and the cellulose phosphoryl chloride formed is prevented from being completely converted into cellulose phosphate. The immediate neutralization of the evolved hydrogen chloride, of course, is important in order to avoid deterioration of the cellulose by the free acid. The importance of preventing conversion of the very unstable cellulose phosphoryl chloride into cellulose phosphate is apparent when one realizes that the subsequent amination is facilitated by the presence of the reactive chlorine.

The following examples will serve to illustrate but should not limit this invention:

Example 1

Treat 10 g. of loose "bleached comber" cotton in 600 cc. of dry pyridine with 5 cc. of phosphoryl chloride while stirring and cooling. After allowing the whole to stand for four hours at 70° C., pass ammonia gas into the reaction mixture for 15 minutes while stirring and cooling. Upon washing and drying of the reacted cotton, we obtained a 10% increase in weight. We find no change in the feel and the general appearance of the reacted cotton.

The loose "bleached comber" cotton reacted as above is completely flameproof and absolutely glowproof. By flame-proof, we mean the ability to resist ignition and the inability of supporting combustion when freely held in the open after exposure to a flame. The flame is self-extinguishing within a few seconds after removal from the ignition flame.

The reacted cotton of this example was analyzed for phosphorus and nitrogen content. Analysis gave 1.75% phosphorus and 0.58% nitrogen which corresponds substantially to the phosphorus-nitrogen ratio of a polyphosphonamide.

Example 2

Alkalize 5 pounds of loose cotton in a 30 gallon iron drum, ice-cooled, and containing 24 pounds of sodium hydroxide, 11.5 gallons of water and 8 gallons of 95% ethyl alcohol. Then place the alkalized cotton into a 50 gallon ice-cooled drum equipped with a motor driven "D" stirrer and containing 35 gallons of carbon tetrachloride. Through a tube reaching deep into the drum add 1050 cc. of phosphoryl chloride dissolved in the same amount of carbon tetrachloride and allow the whole to stand for 1 hour. At the end of this period, squeeze out the cotton, place it into a 50 gallon horizontal, rotating drum and lead ammonia into the drum for 30 minutes. The reacted cotton is then washed with running water and dried. Except for the fact that the cotton has become somewhat discolored by the iron of the equipment which accordingly should be made of corrosion resisting materials, the reacted cotton is found not to be changed in general appearance and feel. Burning tests show it to be well flameproofed. Analysis of the reacted cotton showed a phosphorus content of 2.63% and a nitrogen content of 0.24%.

Example 3

Steep 4 g. of absorbent cotton in a mixture comprising 80 cc. of a 30% solution of sodium hydroxide in water, 80 cc. of 95% ethyl alcohol and 40 cc. of water, allow the whole to stand for 30 minutes, and remove the cotton. After passing the treated cotton twice through wringer rolls, place into a glass flask containing 20 cc. of carbon tetrachloride and 5 cc. of phosphoryl chloride. The flask is stoppered and allowed to stand for 45 minutes, during which time the temperature of the reaction mixture in the flask rises 15 to 20° C. After cooling with ice water, pass ammonia gas into the reaction mixture for 15 minutes, remove the reacted cotton, water wash for 45 minutes, and dry it. We find a weight increase of approximately 1 g. in the reacted cotton; the color is pure white; no apparent strength loss has occurred, and it shows good flame resistance.

Example 4

Immerse 6.5 g. of Indian Head cloth into approximately 300 cc. of dried pyridine contained in a three-neck flask, and then slowly add 5 cc. of phosphoryl chloride while cooling the flask and stirring. Replace the stirrer by a stopper, evacuate the flask four times, and place it overnight into a bath maintained at 60° C. In order to aminate the cloth pass ammonia into the reaction flask for 30 minutes while stirring and cooling. Remove the cloth, wash it for 1 hour, and dry it. We find the cloth to be incombustible. Even after washing 9 times with soap and hot water the cloth continues to remain incombustible.

Example 5

Immerse a 55" x 6" strip (42 g.) of Indian Head cloth in 1.2 liters of dried pyridine contained in a wide mouth jar which is fitted with a mercury seal stirrer, a calcium chloride drying tube and a dropping funnel, and then slowly add, with cooling and stirring, 25 cc. of phosphoryl chloride through the dropping funnel. Remove the stirrer, evacuate the flask 6 times, and place the flask into a bath heated to a temperature of 45° C. Within a period of 30 minutes, raise the temperature of the bath to 72° C. and allow the flask to remain in the bath at this temperature for 3½ hours. Then cool the flask, replace the stirrer, and pass in ammonia for 15 minutes with cooling and vigorous stirring. Upon removing the reacted cloth, washing it and drying it, we find a weight increase of 4 g. and the cloth to be well fireproofed.

Although the above examples illustrate the production of flame-resistant cellulose phosphonamides from loose cotton or cotton cloth, the invention is likewise applicable to the production of phosphonamides from other cellulose-containing materials, such as jute, hemp, viscose rayon, cellulose esters or cellulose ethers, regenerated cellulose, etc. Instead of the pyridine disclosed in some of the examples, we may use other liquid organic bases, of sufficient basicity to serve as neutralizing agents for the hydrogen chloride evolved in the phosphorylation. The use of an organic base as a reaction medium, or of an alkalized cellulose as the cellulosic reactant is desirable because the evolution of free acid is substantially prevented and the original fiber strength of the reacted material is substantially preserved. We may vary the nature and amount of the organic base employed, or the extent to which the cellulose is alkalized with the amount of phosphorylation desired, the extent of phosphorylation, itself, being regulated by the quantity of phosphoryl chloride employed.

The phosphorylation may be carried out to an extent where only about 0.5% of phosphorus as the phosphorus-nitrogen compound is present in the cellulosic body, at which point the product is substantially glowproof. When the phosphorus content is about 1%, as applied by the anhydrous procedure, herein described, the flameproofness is apparent. With higher phosphorus contents the flameproofness is considerably more pronounced.

When the treatment is carried out in the presence of water, as when treating alkali cellulose, the phosphorus content should be at least about 2% for a flameproof product, and may be as high as 2.6% to 3.0%. The treatment may be carried out to the extent where products containing as much as 9% phosphorus and 8% nitrogen are combined with the cellulose.

We claim:
1. A cellulose derivative having the formula:

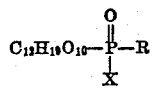

where $C_{12}H_{19}O_{10}$ is a cellulose unit, R is a member of the group consisting of $NH_2$ and $ONH_4$ and X is a member of the group consisting of $NH_2$, $ONH_4$ and $OH$.

2. As a new compound: cellulose phosphonamide.

3. As a new compound cellulose phosphodiamide.

4. As a new compound: cellulose phosphomonoamide.

5. A process for treating cellulose for the purpose of rendering the same fire-resistant, comprising treating cellulose with phosphoryl chloride and thereupon further reacting the product with ammonia.

6. A process for treating cellulose for the purpose of rendering the same fire-resistant, comprising reacting cellulose-containing fibers with phosphoryl chloride under conditions to retard hydrolysis of the formed cellulose phosphoryl chloride, thereupon further treating with ammonia to replace the chlorine in the cellulose phosphoryl chloride with a nitrogenous residue.

7. The process defined in claim 6 in which the treatment with ammonia is carried out in the presence of moisture.

8. A process for treating cellulose for the purpose of rendering the same fire-resistant, comprising reacting cellulose-containing fibers with phosphoryl chloride under conditions to form with a part thereof a cellulose phosphoryl chloride and thereupon treating the product with ammonia to convert said cellulose phosphoryl chloride to the corresponding amide.

9. The process defined in claim 8 in which a cellulose phosphoryl dichloride is formed, which is then converted by the ammonia treatment to the corresponding diamide.

10. The process for treating cellulose for the purpose of rendering the same fire-resistant, comprising reacting cellulose-containing fibers while suspended in dry pyridine with $POCl_3$ and thereafter subjecting said treated product to the action of dry ammonia.

11. The process for treating cellulose for the purpose of rendering the same fire-resistant, comprising reacting alkalized cellulose while suspended in an inert solvent with $POCl_3$ and thereupon treating the cellulose with ammonia.

12. The process defined in claim 11 in which the alkalized cellulose is sodium cellulose.

13. A process for flameproofing cellulose which comprises reacting cellulose with phosphoryl chloride in the presence of dry pyridine at about 70° C. and reacting the product thus formed with ammonia gas.

14. A process for flameproofing a cellulose-containing cloth which comprises reacting said cloth with phosphoryl chloride in the presence of dry pyridine at a temperature substantially within the range of about 45° C. to about 72° C. and then reacting the product thus formed with ammonia.

15. A process for flameproofing a cellulose-containing cloth which comprises reacting said cloth with phosphoryl chloride in the presence of an inert solvent and then reacting the product thus formed with ammonia under substantially anhydrous conditions.

16. A process for flameproofing cellulose which comprises alkalizing the cellulose with an aqueous alcoholic solution of an alkali, reacting the alkalized cellulose with phosphoryl chloride in the presence of an inert solvent and reacting the product thus formed with ammonia.

17. The process defined in claim 11 in which carbon tetrachloride is the inert liquid employed.

18. The process defined in claim 11 in which the phosphorylation step is carried out at a temperature of 15 to 20° C.

19. A cellulose fiber comprising the cellulose derivative defined in claim 1, said fiber containing chemically bound phosphorus in amount of at least 0.5% by weight of said fiber.

CHARLES A. THOMAS.
GENNADY KOSOLAPOFF.